(12) United States Patent
Gill

(10) Patent No.: US 6,985,338 B2
(45) Date of Patent: Jan. 10, 2006

(54) INSULATIVE IN-STACK HARD BIAS FOR GMR SENSOR STABILIZATION

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 10/274,646

(22) Filed: Oct. 21, 2002

(65) Prior Publication Data

US 2004/0075959 A1     Apr. 22, 2004

(51) Int. Cl.
G11B 5/39         (2006.01)
(52) U.S. Cl. .................................. 360/324.12
(58) Field of Classification Search ........... 360/324.12, 360/327.3, 327.32, 314, 324.11, 322, 317, 360/123
See application file for complete search history.

(56) References Cited

U.S. PATENT DOCUMENTS

| | | | | |
|---|---|---|---|---|
| 3,840,898 A | | 10/1974 | Bajorek et al. | 360/113 |
| 4,663,685 A | | 5/1987 | Tsang | 360/113 |
| 5,018,037 A | | 5/1991 | Krounbi et al. | 360/113 |
| 5,751,521 A | * | 5/1998 | Gill | 360/314 |
| 6,178,072 B1 | | 1/2001 | Gill | 360/324.11 |
| 6,295,186 B1 | * | 9/2001 | Hasegawa et al. | 360/324.11 |
| 6,469,873 B1 | * | 10/2002 | Maruyama et al. | 360/314 |
| 6,556,392 B1 | * | 4/2003 | Mao et al. | 360/324.12 |
| 6,704,175 B2 | * | 3/2004 | Li et al. | 360/324.11 |
| 6,744,607 B2 | * | 6/2004 | Freitag et al. | 360/322 |

FOREIGN PATENT DOCUMENTS

JP        2000155910 A   *  6/2000

OTHER PUBLICATIONS

"Contiguous Hard Bias Optimization for Magnet Resistive Head", IBM Technical Disclosure Bulletin, pp. 93-94, (10/26).

"Canted Contiguous Hard Bias Stabilization for Very Thin Magnetoresistive/Giant Magneto-Resistance Sensor", IBM Technical Disclosure Bulletin, pp. 103-104, Jun. 1996.

* cited by examiner

Primary Examiner—Tianjie Chen
(74) Attorney, Agent, or Firm—Walter W. Duft

(57) ABSTRACT

A GMR sensor is disclosed for sensing magnetically recorded information on a data storage medium. The sensor includes a ferromagnetic free layer and a ferromagnetic pinned layer sandwiching an electrically conductive spacer layer. An in-stack, electrically insulative hard biasing layer is adapted to bias the free layer to a neutral magnetic domain orientation when the sensor is in a quiescent state with no external magnetic fields.

39 Claims, 7 Drawing Sheets

INSULATIVE IN-STACK HARD BIAS FOR GMR SENSOR STABILIZATION

BACKGROUND OF THE INVENTION

1. Field of the Invention

The present invention relates to magnetoresistive sensors for reading magnetically-recorded information from data storage media, and particularly to giant magnetoresistive (GMR) read sensors for direct access storage device (DASD) systems.

2. Description of the Prior Art

By way of background, GMR sensors, also known as "spin valve" sensors, are commonly incorporated in read heads for magnetic media-based DASD systems, such as disk drives. A spin valve sensor is a magneto-electrical device that produces a variable voltage output in response to magnetic field fluctuations on an adjacent magnetic storage medium. As illustrated in FIG. 1, a conventional spin valve device is formed by first and second ferromagnetic layers, hereinafter referred to as a "pinned" layer and a "free" layer, separated by an electrically conductive spacer layer. In a disk drive, these layers are oriented so that one edge of the layer stack faces an adjacent disk surface, in a cross-track direction, and so that the layer planes of the stack are perpendicular to the disk surface. The magnetic moment ($M_1$) of the pinned layer is oriented at an angle $\theta_1$ that is perpendicular to the disk surface (i.e., $\theta_1=90°$). It is sometimes referred to as the "transverse" magnetic moment of the sensor. The magnetic moment $M_1$ is substantially pinned so that it will not rotate under the influence of the disk's magnetic domains. Pinning is typically achieved by way of exchange coupling using an adjacent antiferromagnetic pinning layer. The magnetic moment ($M_2$) of the free layer has a zero bias point orientation $\theta_2$ that is parallel to the disk surface (i.e., $\theta_2=0°$). It is sometimes referred to as the "longitudinal" magnetic moment of the sensor. The magnetic moment $M_2$ is free to rotate in positive and negative directions relative to the zero bias point position when influenced by positive and negative magnetic domains recorded on the disk surface. In a digital recording scheme, the positive and negative magnetic domains correspond to digital "1s" and "0s." The zero bias point is the position of the free layer magnetic moment $M_2$ when the sensor is in a quiescent state and no external magnetic fields are present.

Electrical leads are positioned to make electrical contact with the pinned, free and spacer layers. In a CIP (Current-In-Plane) spin valve sensor, as shown in FIG. 1, the leads are arranged so that electrical current passes through the sensor stack in a cross-track direction parallel to the layer planes of the stack. When a sense current is applied by the leads, a readback signal is generated in the drive processing circuitry which is a function of the resistance changes that result when the free layer magnetic moment $M_2$ rotates relative to the pinned layer magnetic moment $M_1$ under the influence of the recorded magnetic domains. These resistance changes are due to increases/decreases in the spin-dependent scattering of electrons at the interfaces of the spacer layer and the free and pinned layers as the free layer's magnetic moment $M_2$ rotates relative to the magnetic moment $M_1$ of the pinned layer. Resistance is lowest when the free and pinned layer magnetic moments are parallel to each other (i.e., $\theta_2=90°$) and highest when the magnetic moments are antiparallel (i.e., $\theta_2=90°$). The applicable relationship is as follows:

$$\Delta R \propto \cos(\theta_1-\theta_2) \propto \sin \theta_2.$$

The $\Delta R$ resistance changes cause potential differences that are processed as read signals. As can be seen from the foregoing relationship, it is important that the magnetic moment of the free layer be directed substantially parallel to the disk surface (i.e., $\theta_2=0°$) when the sensor is in its quiescent state. The parallel position corresponds to a zero bias point on a transfer curve of the sensor that represents GMR effect $\Delta R/R$ (ratio of change in resistance to resistance of the sensor) as a function of applied magnetic fields. This allows for read signal symmetry upon the occurrence of the positive and negative magnetic field incursions from the recorded magnetic domains on the disk surface. Unfortunately, during the quiescent state there are often magnetic forces acting on the free layer that cause its magnetic moment $M_2$ to rotate from the desired orientation parallel to the ABS (i.e., $\theta_2 \neq 0°$). This results in read signal asymmetry in which the potential changes of the positive and negative read signals are unequal, thus producing a reduced readback signal. Accordingly, there is an ongoing effort to balance the magnetic forces acting on the free layer in the quiescent state.

One technique used to orient the free layer's magnetic moment during quiescence is to place electrically conductive hard biasing regions underneath the electrical leads in adjacent coplanar relationship with the free layer to help stabilize the free layer magnetic domains in the desired orientation. Conventional hard biasing regions are made of ferromagnetic material with relatively high magnetic coercivity ($H_c$), such as CoCrPt and alloys thereof. A property of these materials is that they are electrically conductive. This is not a problem in conventional CIP spin valve designs wherein the hard biasing regions are located in the electrical pathway between the leads that deliver sense current to the device. However, in other designs the electrical conductivity of conventional hard biasing materials may be detrimental to device operation. Consider, for example, an in-stack hard biasing design in which the hard biasing material is located out of the plane of the free layer so as to occupy its own in-stack layer. Such a design could facilitate reduced track widths that in turn would provide increased data storage density. In-stack hard biasing would also eliminate the complicated fabrication of "contiguous junctions" between the hard biasing regions and the free layer, as is commonly used in conventional hard biasing schemes. Notwithstanding these advantages, the conductive properties of conventional hard biasing materials make an in-stack hard biasing design impractical insofar as the sense current could be shunted through the hard biasing region and away from the free, pinned and spacer layers, so as to thereby reduce the readback signal.

Accordingly, a need exists for a GMR sensor configuration wherein in-stack hard biasing is made possible without shunting sense current away from the electrical pathways of the device. What is required in particular is a GMR sensor having an in-stack hard biasing region that is magnetically hard yet electrically insulative.

SUMMARY OF THE INVENTION

The foregoing problems are solved and an advance in the art is obtained by a novel GMR sensor for sensing magnetically recorded information on a data storage medium. The sensor includes a ferromagnetic free layer and a ferromagnetic pinned layer sandwiching an electrically conductive spacer layer. An in-stack, electrically insulative hard biasing layer is adapted to bias the free layer to a neutral magnetic domain orientation when the sensor is in a quiescent state with no external magnetic fields.

The hard biasing layer is formed from a ferromagnetic material having high electrical resistivity, such as CoFeO or FeHfO. Its magnetic moment is pinned in a direction that is antiparallel to the zero bias point orientation of the free layer's magnetic moment. A small (preferably negative) magneto static coupling thereby develops to stabilize the free layer magnetic moment, preferably without pinning the free layer via exchange biasing. To that end, a thin insulative spacer layer is used to separate the hard biasing layer from the free layer.

The hard biasing layer can be externally pinned or it can be self pinned. In an externally pinned arrangement, an electrically insulative pinning layer is formed adjacent to the hard biasing layer using a material that is adapted to raise the hard biasing layer's magnetic coercivity (Hc) or bias it by exchange coupling. The pinning layer can be formed from a material selected form the group consisting of alpha-$Fe_2O_3$ and NiO. If the pinning layer if made from alpha-$Fe_2O_3$, it can be located either above or below the hard layer, on an opposite side of the hard biasing layer from the free layer. If the pinning layer comprises NiO, it should be located below the hard biasing layer on an opposite side of the biasing sublayer from the free layer. In a self pinned arrangement, the sensor is formed so that the hard biasing layer has very high negative magnetostriction and a very large net compressive stress. If desired, the hard biasing layer can be used to provide a gap layer of the sensor.

The invention further contemplates methods for fabricating GMR sensors with in-stack hard biasing. In a first exemplary method of the invention, a GMR sensor is made according to the following steps:

(1) forming a ferromagnetic pinned layer having a substantially fixed magnetic moment;
(2) forming an electrically conductive spacer layer above the ferromagnetic pinned layer;
(3) forming a ferromagnetic free layer above the electrically conductive spacer layer;
(4) forming an insulative spacer layer above the free layer; and
(5) forming an in-stack, electrically insulative hard biasing layer above the insulative spacer layer.

In another exemplary method of the invention, a GMR sensor can be made according to the following steps:

(1) forming an in-stack, electrically insulative hard biasing layer;
(2) forming an electrically insulative spacer layer above the hard biasing layer;
(3) forming a ferromagnetic free layer above the electrically insulative spacer layer;
(4) forming an electrically conductive spacer layer above the ferromagnetic free layer; and
(5) forming a ferromagnetic pinned layer above the electrically conductive spacer layer having a substantially fixed magnetic moment.

The invention additionally contemplates a magnetic head incorporating a GMR sensor having in-stack hard biasing, and a disk drive incorporating such a sensor.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
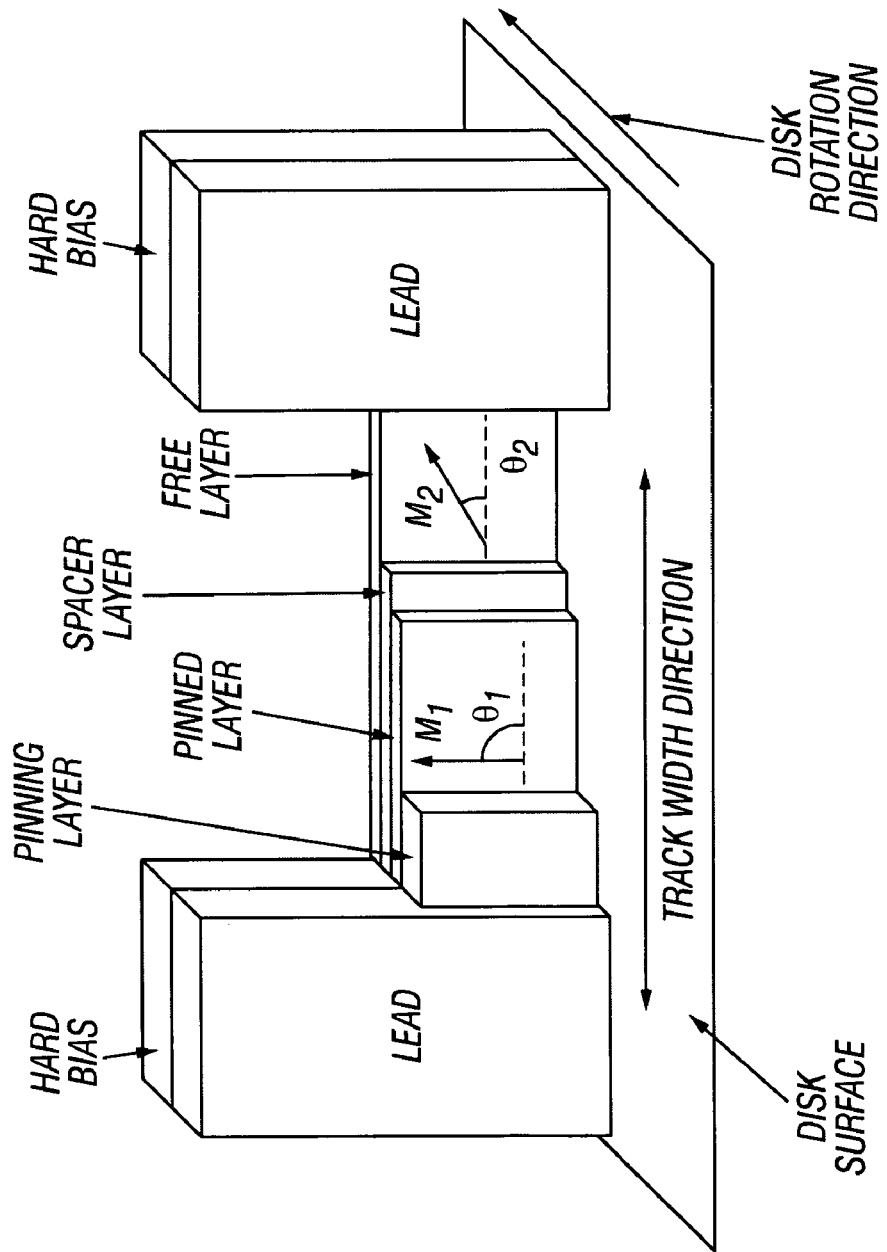
FIG. 1 is a perspective view showing a conventional CIP spin valve sensor.
Figure 2:
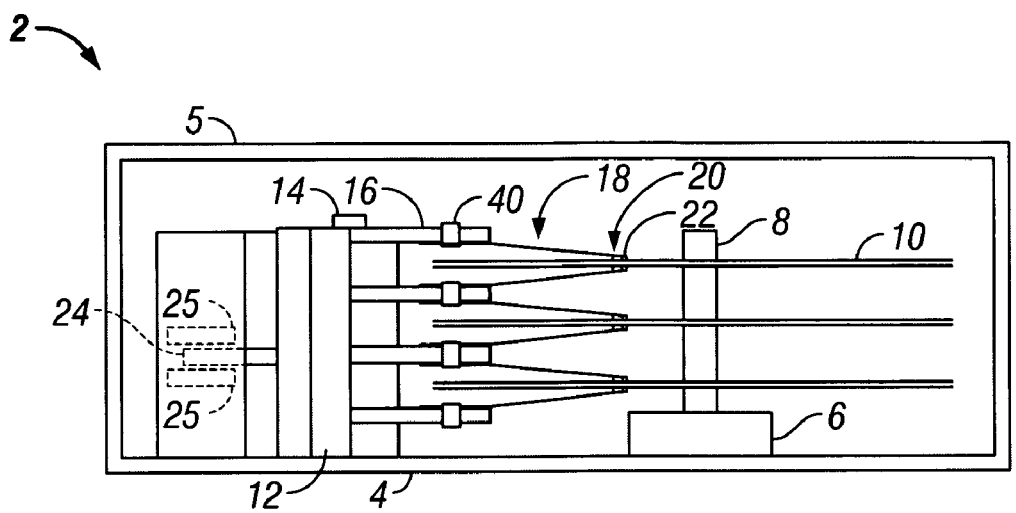
FIG. 2 is a side elevational view showing the interior of a disk drive incorporating a GMR spin valve sensor constructed in accordance with the present invention.
Figure 3:
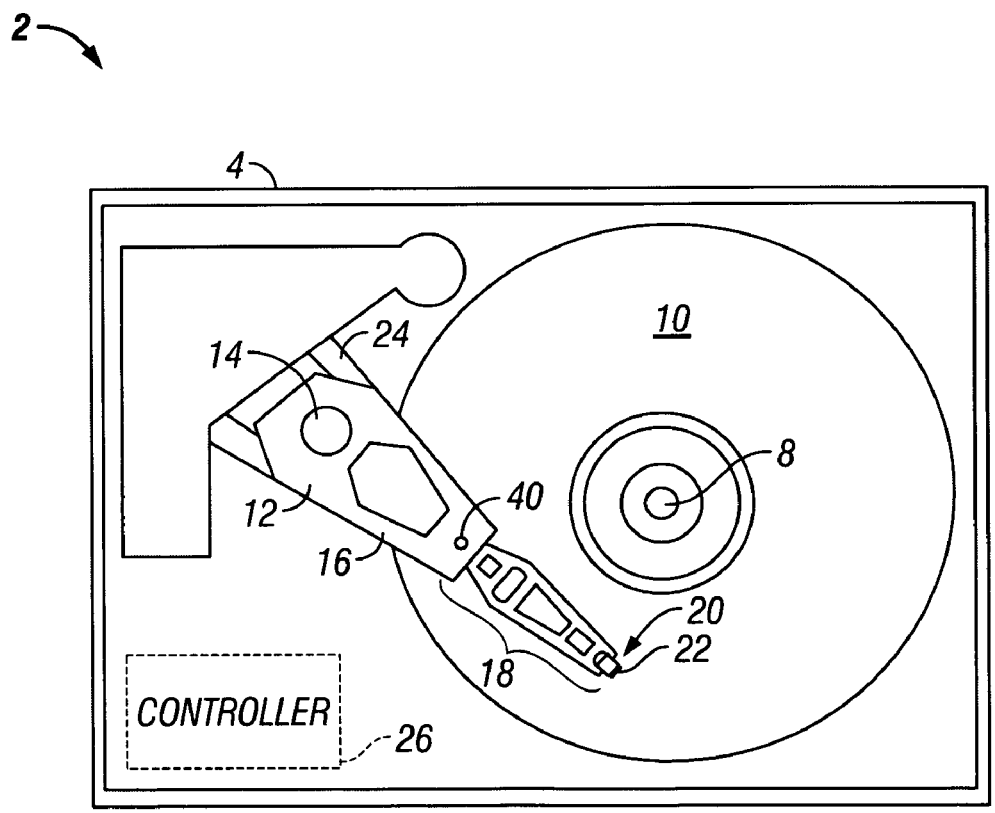
FIG. 3 is a plan view of the disk drive of FIG. 2.

Turning now to the figures (which are not necessarily to scale), wherein like reference numerals represent like elements in all of the several views, FIGS. 2 and 3 illustrate an exemplary disk drive 2 that incorporates a GMR spin valve sensor having an in-stack, electrically insulative hard biasing region in accordance with the invention. Note that the disk drive 2 is shown in greatly simplified schematic form, with only those construction details that are necessary for an understanding of the invention being represented. As to these illustrated components, it should be understood that all are conventional in nature unless otherwise indicated below.

The disk drive 2 conventionally includes a base casting 4 made from aluminum or other suitable material. A cover 5 is removably mounted thereto via a hermetic seal (not shown). The base casting 4 supports a conventional spindle drive motor 6 having an associated drive spindle 8. The drive spindle 8 carries a set of disks 10 for high speed rotation therewith. The disks 10 form a spaced vertically stacked disk platter arrangement. Each disk 10 is conventionally formed from an aluminum or glass substrate with appropriate coatings being applied thereto such that at least one, and preferably both, of the upper and lower surfaces of the disks are magnetically encodable and aerodynamically configured for high speed interaction with a read/write transducer (described below).

Data access to the disk surfaces is achieved with the aid of an actuator 12 that is mounted for rotation about a stationary pivot shaft 14. The actuator 12 includes a set of rigid actuator arms 16 that respectively carry either one or two flexible suspensions 18 (see FIG. 2). Each suspension 18 supports a slider 20 and a transducer 22 that are positioned to interact with an associated disk surface, representing the transducer's recording medium. The sliders 20 are aerodynamically designed so that when the disks 10 are rotated at operational speed, an air bearing develops between each slider and its associated disk surface. The air bearing is very thin (typically 0.05 $\mu$m) so that the transducers 22 are positioned in close proximity to the recording media. A conventional voice coil motor 24 is provided for pivoting the actuator 12. This motion sweeps the actuator arms 16 and their slider-carrying suspensions 18 generally radially across the respective surfaces of the disks 10, allowing the transducers 22 to be positioned from one concentric data track to another during seek, settle and track following operations of the drive 2.

As described in more detail below, each transducer 22 is an integrated device that includes a magnetic write head and a GMR spin valve sensor read head constructed in accordance with the invention. Data is read from the disks 10 by the read head portion of each transducer 22. This data is processed into readback signals by signal amplification and processing circuitry (not shown) that is conventionally located on each actuator arm 16. The readback signals carry either customer data or transducer position control information depending on whether the active read head is reading from a customer data region or a servo region on one of the disks 10. The readback signals are sent to the drive controller 25 for conventional processing. Data is recorded on the disks 10 by the write head portion of each transducer 22. This data is provided by write data signals that are generated by the controller 25 during data write operations. The write data signals are delivered to whichever write head is actively writing data. The active write head then records the positive and negative magnetic domains representing digital information to be stored onto the recording medium.

Figure 5:
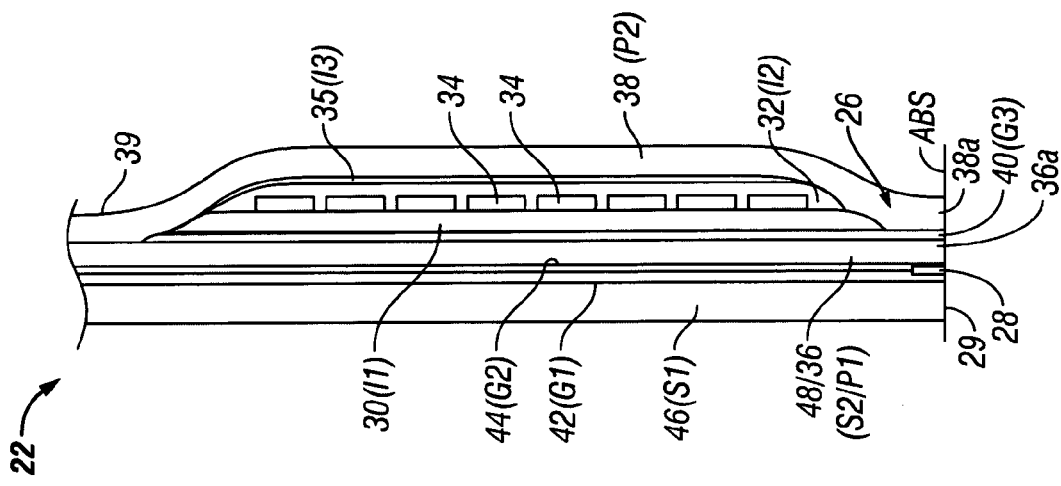
FIG. 5 is a side elevational view of the transducer of FIG. 4.
Figure 4:
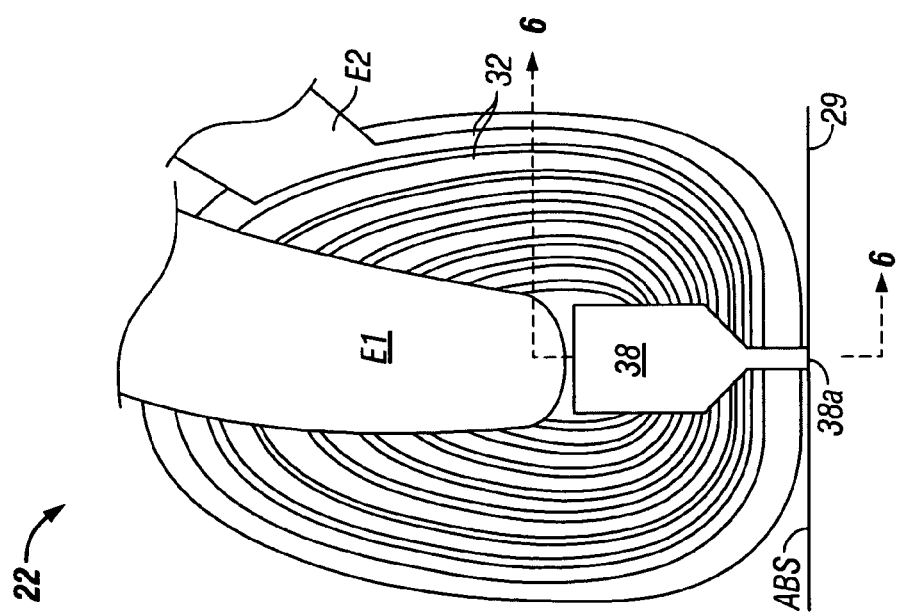
FIG. 4 is a plan view of an integrated read/write transducer for use in the disk drive of FIG. 2.
Figure 6:
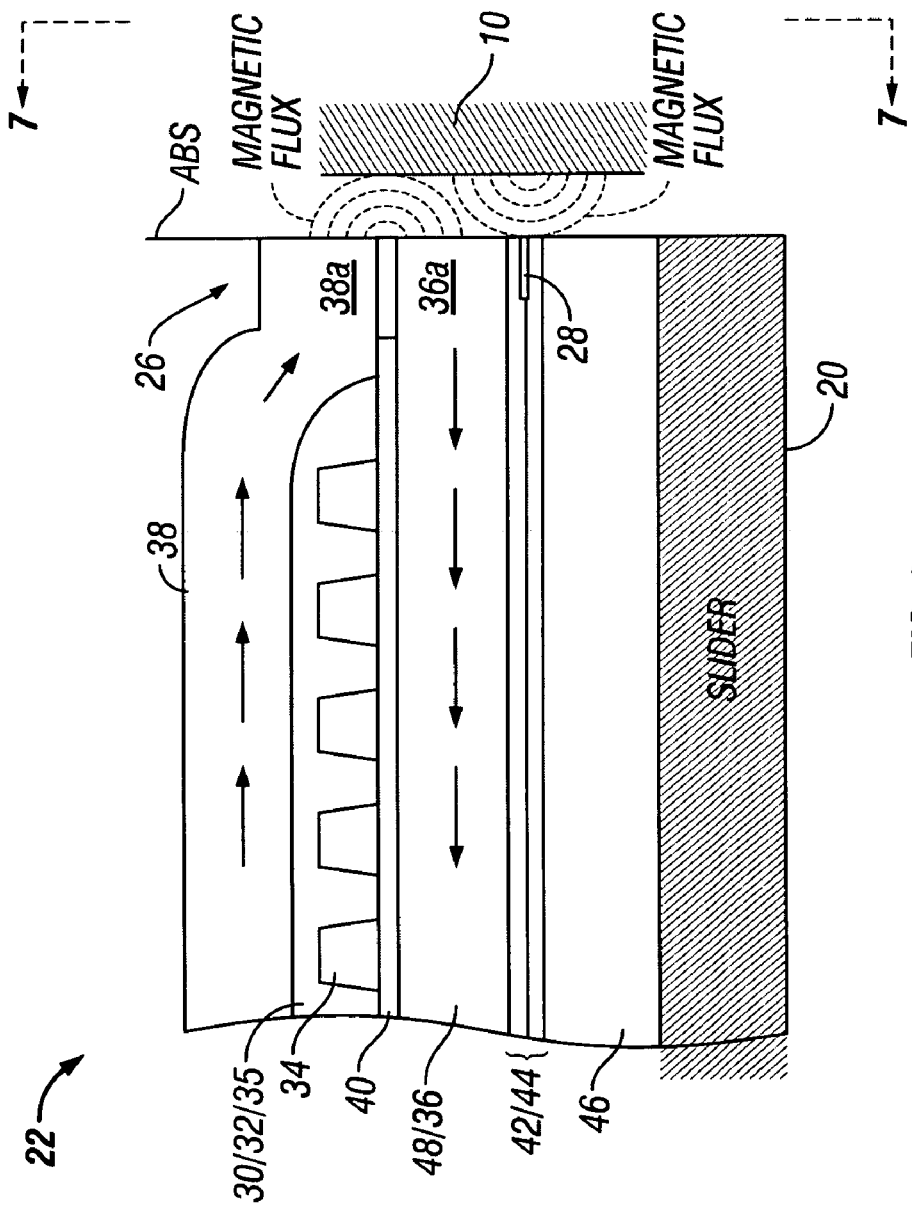
FIG. 6 is a cross-sectional view taken along line 6—6 in FIG. 4.
Figure 7:
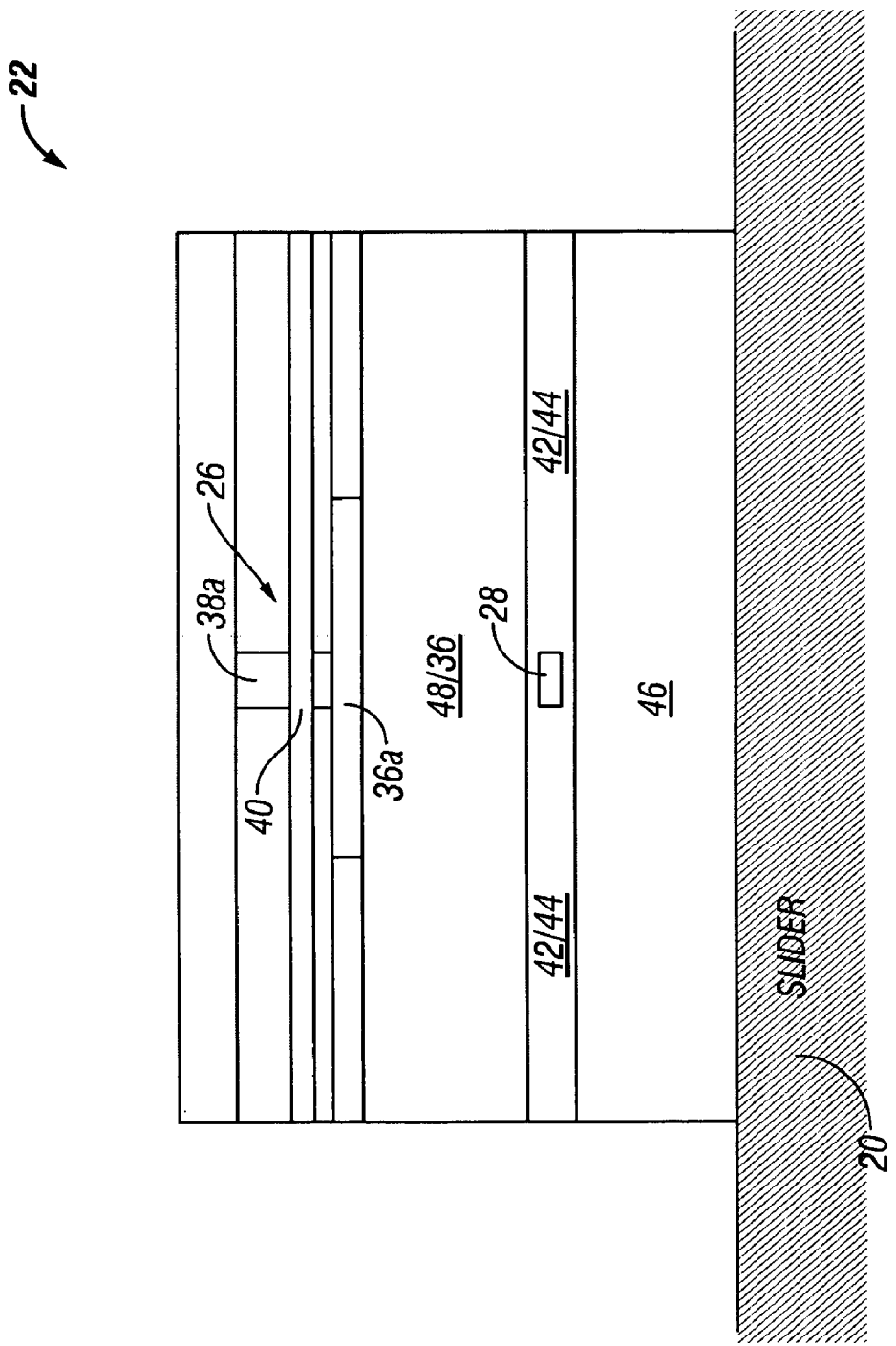
FIG. 7 is an ABS view of the transducer of FIG. 3 taken in the direction of arrows 7—7 in FIG. 6.

Turning now to FIGS. 4–7, an exemplary one of the transducers 22 is shown as including a transducer write head portion 26 and a transducer read head portion 28. In FIGS. 4–6, the transducer 22 is shown as being lapped at 29 to form an air bearing surface (ABS) where the transducer magnetically interacts with the adjacent rotating disk surface. The ABS 29 is spaced from the disk surface during drive operations by virtue of the above-described air bearing. FIG. 7 depicts the transducer 22 from the vantage point of the disk surface, looking toward the ABS 29.

The write head 26 conventionally includes a first insulative layer 30 (commonly referred to as "I1") supporting a second insulative layer 32 (commonly referred to as "I2") that carries plural inductive coil loops 34. A third insulative layer 35 (commonly referred to as "I3") can be formed above the coil loops 34 for planarizing the write head 26 to eliminate ripples in the I2 insulative layer 32 caused by the coil loops. The coil loops 34 inductively drive first and second pole pieces 36 and 38 that form the yoke portion of the write head 26. The pole pieces 36 and 38 respectively extend from a back gap 39 to pole tips 36a and 38a located at the ABS 29. An insulative gap layer 40 (commonly referred to as "G3") is sandwiched between the pole pieces 36 and 38 to provide a magnetic write gap at the pole tips 36a and 38a. Note that the pole piece 36 is commonly referred to as a "P1" pole piece. The pole piece 38 may be referred to as a "P2" or "P3" pole piece depending on how the pole tip 38a is formed. It is labeled as "P2" in FIG. 5. During data write operations, electrical current passing through a pair of electrical leads E1 and E2 to the coil loops 34 generates a magnetic field that induces a magnetic flux in the P1 and P2 layers 36 and 38. As shown in FIG. 6, this magnetic flux propagates from the yoke to the pole tips 36a and 38a, where it fringes across the gap layer 40 at the ABS 29. This causes magnetic domains to be formed on an adjacent recording surface of one of the disks 10. The orientation of each recorded magnetic domain is dependent on the magnetization direction of the pole tips 36a and 38a, which in turn is determined by the direction of the electrical current passing through the coil loops 34. Reversing the coil's electrical current reverses the magnetization direction of the pole tips 36a and 38a, and consequently reverses the orientation of the next recorded magnetic domain. This magnetization reversal process is used to encode data on the recording medium.

The read head 28 lies between insulative gap layers 42 and 44 at the ABS 29, where it is influenced by magnetic flux emanating from the adjacent disk surface. The gap layers 42 and 44 are commonly referred to as "G1" and "G2" gap areas, and are sandwiched between a first magnetic shield layer 46 (commonly referred to as an "S1" shield) and second magnetic shield layer 48 (commonly referred to as an "S2" shield). In some designs, including that of FIG. 5, the S2 shield layer 48 also provides the P1 pole piece 36. The P1 shield layer 46 is conventionally formed over the slider 20, which is only partially shown in FIGS. 5 and 6 for clarity.

Figure 8:
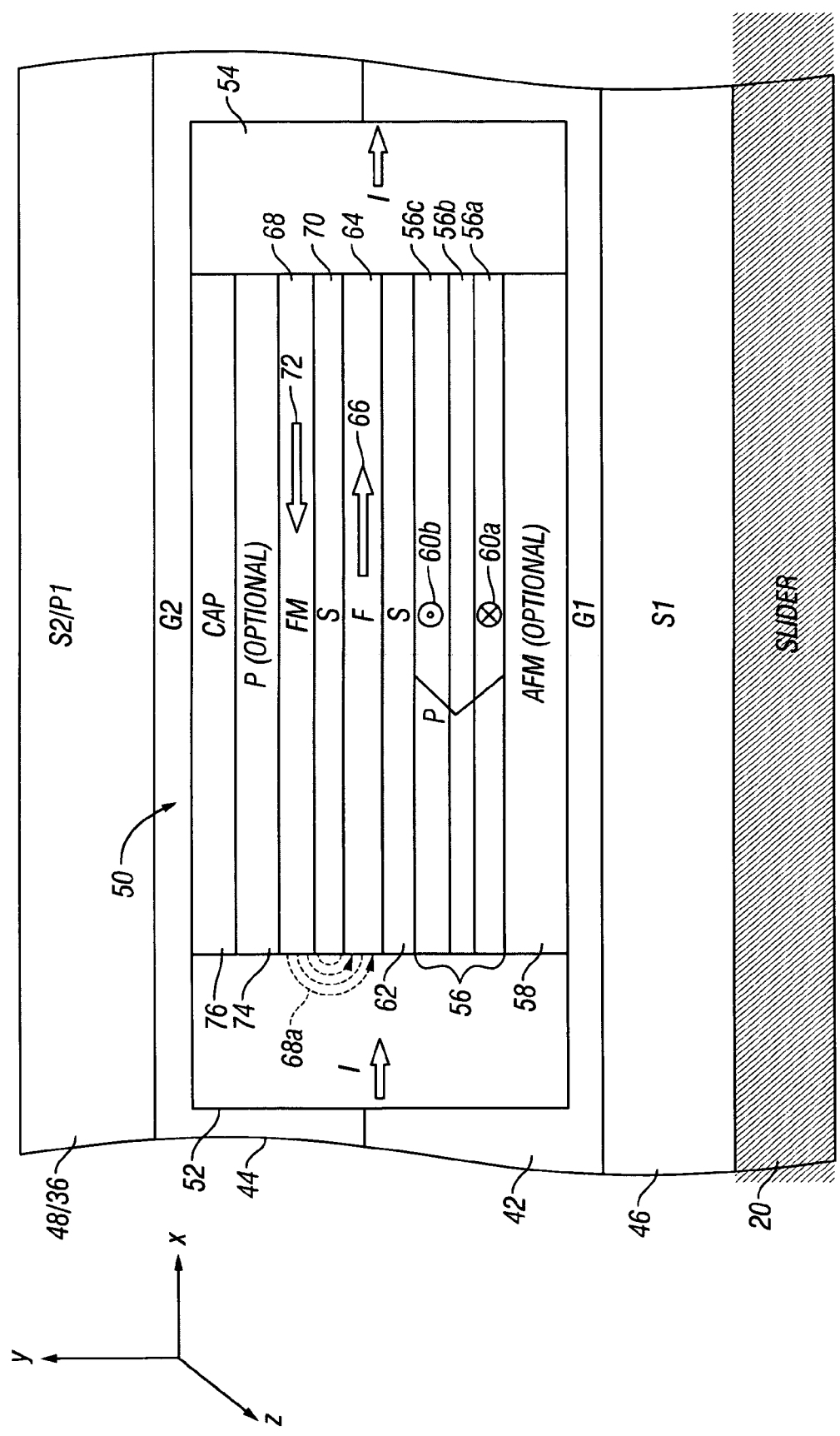
FIG. 8 is a detailed ABS view of a first exemplary embodiment of a GMR spin valve sensor constructed in accordance with the invention.

Turning now to FIG. 8, the read head 28 is shown to comprise a GMR spin valve sensor 50 that is constructed in accordance with a first embodiment of the invention. As in the case of FIG. 7, the view of FIG. 8 is taken on a plane that is parallel to the ABS 29. The "x" axis in FIG. 8 represents the radial track width direction of a concentric track on the adjacent disk surface. The "y" axis in FIG. 8 represents the circumferential centerline direction of a concentric track on the disk. The "z" axis represents the direction pointing perpendicularly into the disk surface.

It will be seen in FIG. 8 that the sensor 50 has multiple materials layers that are sandwiched between the S1 and G1 layers 46 and 42 on one side, and the S2 and G2 layers 48 and 44 on the other side. A pair of electrical leads 52 and 54 are situated to deliver a sense current "I" to the sensor 50 according to a CIP orientation.

The sensor 50 begins with a ferromagnetic pinned (P) layer 56 whose magnetic moment is fixed in a direction that is perpendicular to the plane of FIG. 8. Although the pinned layer 56 could be self pinned by forming it with very high positive magnetostriction and very large compressive stress (according to existing techniques), FIG. 8 shows an implementation wherein the pinned layer 56 is externally pinned by an optional antiferromagnetic (AFM) pinning layer 58. The pinning layer 58 is deposited on the G1 gap layer 42 to a suitable thickness (e.g., approximately 100–150 Å) using Pt—Mn, Ni—Mn, IrMn, or other suitable antiferromagnetic material that is capable of exchange biasing the ferromagnetic material in the pinned layer 56.

The pinned layer 56 can be implemented as a single layer having a single magnetic domain orientation, or as plural sub-layers having parallel and anti-parallel magnetic domain directions. FIG. 8 shows the latter configuration, with the pinned layer 56 being formed by growing a first sublayer 56a of CoFe, a second sublayer 56b of Ru, and a third sublayer 56c of CoFe. These sublayers are formed on top of the pinning layer 58 to a collective thickness of approximately 10–80 Å. The magnetic moment of the first sublayer 56a is shown by the arrow tail 60a, which points into the plane of FIG. 8. The magnetic moment of the third sublayer 56c is shown by the arrow head 60b, which points out of the plane of FIG. 8. Note that both magnetic moments are oriented generally perpendicular to the sensing surface (ABS) of the sensor 50.

Other suitable ferromagnetic materials, such as Co or Ni—Fe (permalloy), could be used in place of CoFe in the first and third sublayers 56a and 56c. In an alternative configuration, the pinned layer 56 can be comprised largely of a bulk $Ni_{(100-x)}Fe_{(x)}$ layer with a thin 10–20 Å layer of Co or $Co_{(100-y)}Fe_{(y)}$ or $Ni_{(100-x)}Fe_{(x)}$ (where x is approximately 20) material at the interface with the spacer layer 62 (described below) that overlies the pinned layer.

As stated, the pinned layer 56 will have its magnetic moment fixed by interfacial exchange coupling with the pinning layer 58. The magnetization direction(s) of the pinned layer 56 will be sufficiently fixed by the exchange-biasing pinning layer 58 to prevent rotation thereof in the presence of small external magnetic fields, such as magnetic domains recorded on the adjacent disk surface.

A spacer layer 62 is formed on top of the pinned layer 56 as a suitably thick layer (e.g., approximately 18 Å) of an electrically conductive, non-ferromagnetic material, such as Cu. Above the spacer layer 62 is another ferromagnetic layer that forms the sensor's free layer 64. The free layer 64 can be formed by covering the spacer layer 62 with CoFe, Co, Ni—Fe or other suitable ferromagnetic material grown to a thickness of approximately 30 Å. In an alternative configuration, the free layer 64 can be formed from a thin $Co_{(100-y)}Fe_{(y)}$, or $Ni_{(100-x)}Fe_{(x)}$ partial layer at the interface with the spacer layer 62, with the bulk of the free layer 64 being a low magnetostriction material, such as $Ni_{(100-x)}Fe_{(x)}$ (where x is approximately 19). Note that the net magnetostriction of this type of free layer 64 is preferably arranged to have a negative value by making slight variations to the composition of the bulk of the partial free layer.

The arrow 66 in FIG. 8 shows the preferred zero bias point magnetization direction (magnetic moment) of the free layer 64 when the sensor 50 is in a quiescent state with no magnetic field incursions from the adjacent disk surface. This magnetization direction, which is parallel to the plane of FIG. 8, is influenced by an in-stack hard biasing layer 68 formed above the layer 64. As described further below, the hard biasing layer 68 is formed from a hard ferromagnetic material (FM) and has a magnetic moment shown by the arrow labeled 72 in FIG. 7. The magnetic moment 72 is antiparallel to the magnetic moment 66 of the free layer 64. This helps orient the free layer magnetic moment 66 in the desired in-plane direction. The hard biasing layer 68 is intended to bias the free layer 64 via a small (preferably negative) magneto static coupling field 68a, without exchange biasing (pinning) the free layer. To that end, the hard biasing layer 68 and the free layer 64 are separated by a thin insulating layer 70 made from $TaO_x$ (where x is determined by oxidation conditions), $Al_2O_3$ or the like. An oxide of copper or ruthenium may also be used. An advantage of the latter two materials is that they can be applied at a thickness which promotes a negative RKKY coupling field (not shown). The negative RKKY coupling field, though relatively small, adds to the negative magneto static coupling field 68a. The other two spacer materials, $TaO_x$ and $Al_2O_3$, produce a positive RKKY coupling field that opposes the negative magneto static coupling field 68a, albeit very weakly. The thickness of the insulating spacer layer 70 may range from approximately 20–100 Å. More preferably, the spacer layer thickness ranges from approximately 20–50 Å.

The hard biasing layer 68 is made of a material of high electrical resistivity that is sufficiently electrically insulative to prevent substantial sense current shunting and consequent signal loss. Exemplary materials include CoFeO and FeHfO. Both materials can be deposited using conventional thin film deposition techniques. A layer thickness of approximately 30 Å may be used. The hard biasing layer 68 can be hardened magnetically in any of several ways. The most preferred approach is to self pin the hard biasing layer 68 by forming it with very high negative magnetostriction and large compressive stress. This allows the hard biasing layer 68 to become magnetically stiff without having high magnetic coercivity (Hc) and associated domain structures that can stiffen the free layer 64. To achieve high negative magnetostriction, the exemplary CoFeO and FeHfO materials of the hard biasing layer 68 can be modified by adding effective amounts of niobium, nickel or the like.

Other approaches to magnetically hardening the hard biasing layer 68 rely on external biasing using an optional pinning layer 74. The pinning layer 74 can be made from an electrically insulative material that pins the biasing layer 68 by increasing its coercivity Hc or by exchange coupling. One exemplary material is alpha-$Fe_2O_3$, where the "alpha" signifies that the iron oxide is dominated by alpha phase crystalline structures. This material pins the hard biasing layer 68 by increasing Hc. The material can be deposited to a desired thickness (e.g., approximately 100 Å) using conventional sputter deposition followed by annealing at a temperature that produces the desired alpha phase.

The sensor 50 is completed by forming a conventional cap layer 76 on top of the pinning layer 74 (or the hard biasing layer 68 if no pinning layer is present). A conventional electrically insulative material such as $TaO_x$ may be used for this purpose. The thickness of the cap layer 76 is approximately 40 Å. Alternatively, because the hard biasing layer 68 and the pinning layer 74 are electrically insulative, the cap layer 76 could be eliminated, as could the G2 gap layer 44.

During operation of the sensor 50, the sense current I is passed through the sensor from the electrode 52 to the electrode 54. When the sense current I passes through the sensor 50 and there are no positive or negative magnetic incursions from the rotating disk surface, the sensor is said to be in a quiescent state. In this state, the magnetic moment 66 of the free layer 64 will be oriented as shown in FIG. 8, with magnetic domain stabilization being provided by the in-stack hard biasing layer 68. When positive or negative magnetic incursions are introduced into the sensor 50, the magnetic moment 66 of the free layer 64 will rotate upwardly or downwardly out of the plane of FIG. 8 (i.e. toward or away from the reader). Note that sense current will not be shunted through the hard biasing layer 68 due to its insulative properties.

Figure 9:
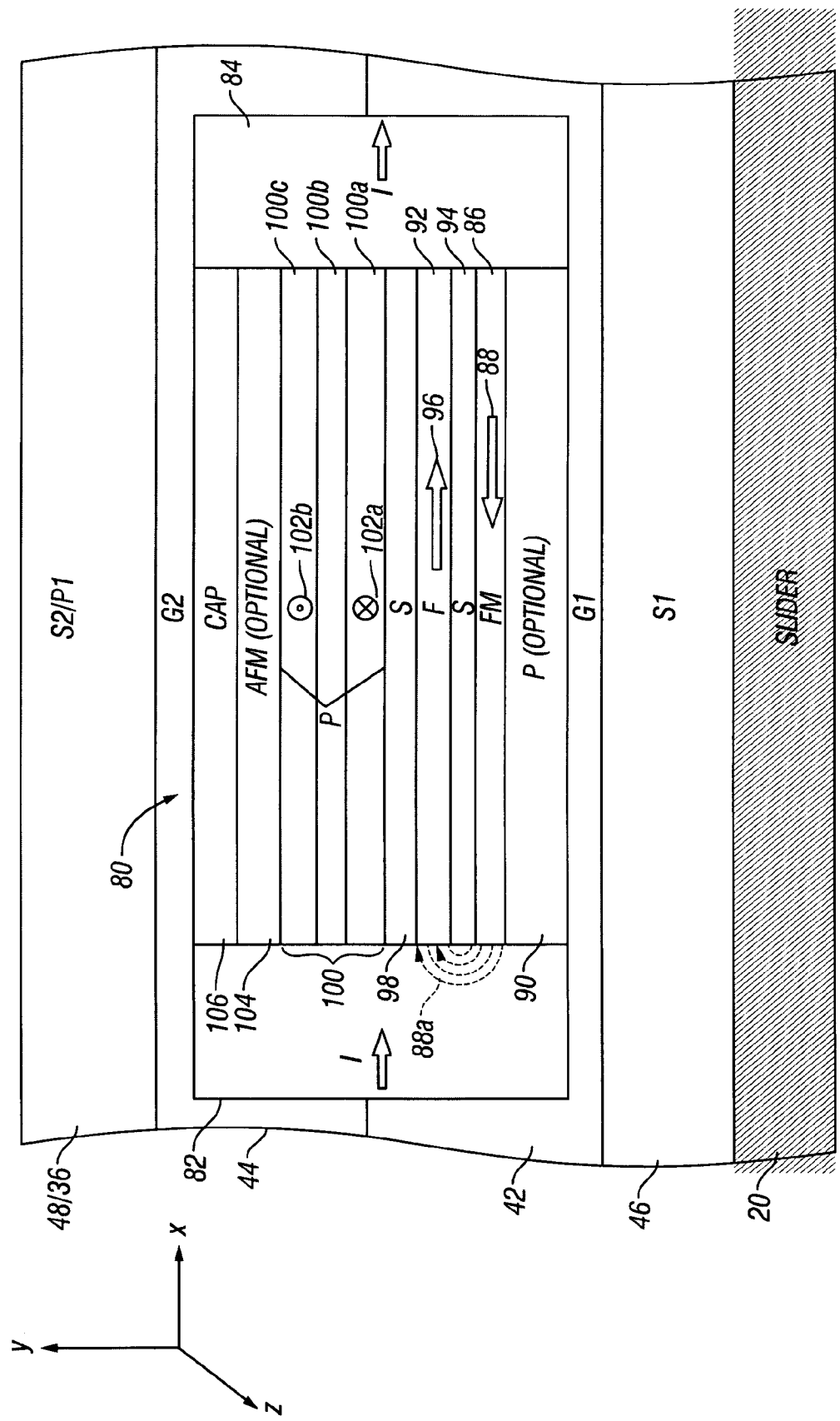
FIG. 9 is a detailed ABS view of a second exemplary embodiment of a GMR spin valve sensor constructed in accordance with the invention.

Turning now to FIG. 9, a GMR spin valve sensor 80 is constructed in accordance with a second embodiment of the invention in which the sensor layers are in reverse order from the layers of the sensor 50. Moreover, an alternative material is shown for use in pinning the in-stack hard biasing layer.

It will be seen in FIG. 9 that the sensor 80 has multiple materials layers that are sandwiched between the shield and gap layers of the read head 28. In particular, the S1 and G1 layers 46 and 42 are disposed on one side of the sensor 80, and the S2 and G2 layers 48 and 44 are disposed on the other side. A pair of electrical leads 82 and 84 are situated to deliver a sense current "I" to the sensor 80 according to a CIP orientation.

The sensor 80 begins with an in-stack hard biasing layer 86 made from a hard ferromagnetic material (FM) and having a magnetic moment shown by the arrow labeled 88 in FIG. 9. As in the case of the hard biasing layer 68 of FIG. 8, the hard biasing layer 86 is made from a ferromagnetic material of high electrical resistivity so as to be sufficiently electrically insulative to prevent substantial sense current shunting and consequent signal loss. Exemplary materials include CoFeO, which can be deposited using conventional thin film deposition techniques to a layer thickness of approximately 30 Å. The hard biasing layer 86 is preferably self pinned by forming it with very high negative magnetostriction and large compressive stress. To that end, effective amounts of niobium, nickel or the like can be added to the base CoFe material to provide the requisite negative magnetostriction. Alternatively, the hard biasing layer 86 can be externally pinned by an adjacent pinning layer 90 deposited at a layer thickness of approximately 30 Å. The pinning layer 90 can be made from an electrically insulative material that pins the biasing layer 86 by increasing its coercivity Hc or by exchange coupling. One exemplary material is alpha-$Fe_2O_3$, which is used in the sensor 50 of FIG. 8 and described above. Another suitable pinning material is NiO. This material pins the hard biasing layer 86 by exchange coupling. It can be deposited via conventional deposition or the like.

It should be noted that the alpha-$Fe_2O_3$ material provides a pinning effect regardless of whether it is disposed above or below the hard biasing layer, as respectively illustrated by the sensor configurations of FIGS. 8 and 9. On the other hand, the NiO material appears to only provide a pinning effect when it is disposed below the hard biasing layer, as in the sensor configuration of FIG. 9.

If desired, the hard biasing layer 86 and the pinning layer 90 can be formed on the insulative material that forms the G1 gap layer 44. Alternatively, because the hard biasing and pinning layers 86 and 90 are electrically insulative, they can used to provide the G1 gap layer 44 without any additional gap layer material.

The sensor's free layer 92 is formed above the hard biasing layer 86, but is preferably separated therefrom by an insulative spacer layer 94. The free layer 92 has a thickness of approximately 30 Å, and can be formed in the same manner as the free layer 64 of FIG. 8. It has a preferred magnetization direction (magnetic moment) shown by the arrow 96 in FIG. 9 when the sensor 80 is in a quiescent state with no magnetic field incursions from the adjacent disk surface. This magnetization direction, which is parallel to the plane of FIG. 8, is influenced by the pinned magnetic moment 88 of the hard biasing layer 86, which is antiparallel to the magnetic moment 96. The magnetic moment 88 helps orient the free layer magnetic moment 86 in the desired in-plane direction by way of a small (preferably negative) magneto static coupling field 88a, without exchange biasing (pinning) the free layer. To that end, the insulative spacer layer 94 may have a thickness of approximately 20-100 Å, and more preferably 20–50 Å. It can be formed in the same manner as the spacer layer 70 of FIG. 8.

An electrically conductive spacer layer 98 having a thickness of approximately 18 Å is formed above the free layer 92. It can be constructed in the same manner as the spacer layer 62 of FIG. 8.

A ferromagnetic pinned layer 100 is situated on top of the spacer layer 98. The pinned layer 100 can be formed in the same manner as the pinned layer 56 of FIG. 8, namely, as a single layer having a single magnetic domain orientation, or as plural sub-layers having parallel and anti-parallel magnetic domain directions. FIG. 9 shows the latter configuration, with the pinned layer 100 being formed by growing a first sublayer 100a of CoFe, a second sublayer 100b of Ru, and a third sublayer 100c of CoFe to a total thickness of approximately 10–80 Å. The magnetic moment of the first sublayer 100a is shown by the arrow tail 102a, which points into the plane of FIG. 9. The magnetic moment of the third sublayer 100c is shown by the arrow head 102b, which points out of the plane of FIG. 9. Note that both magnetic moments are oriented generally perpendicular to the sensing surface (ABS) of the sensor 80.

Although the pinned layer 100 could be self pinned by forming it with very high negative magnetostriction and very large compressive stress (according to existing techniques), FIG. 9 shows an implementation wherein the pinned layer 100 is externally pinned by an optional antiferromagnetic (AFM) pinning layer 104. The pinning layer 104 has a thickness of approximately 100–150 521 and can be formed in the same manner as the pinning layer 58 of FIG. 8 so as to fix the magnetic moment of the pinned layer 100 by interfacial exchange coupling.

The sensor 80 is completed by forming a conventional cap layer 106 on top of the pinning layer 104. The cap layer 106 has a thickness of approximately 40 Å and may be formed in the same manner as the cap layer 76 of FIG. 8.

During operation of the sensor 80, the electrical sense current I is passed through the sensor from the electrode 82 to the electrode 84. When the sense current I passes through the sensor 80 and there are no positive or negative magnetic incursions imposed on the sensor from the rotating disk surface, the sensor is said to be in a quiescent state. In this state, the magnetic moment 96 of the free layer 92 will be oriented as shown in FIG. 9, with magnetic domain stabilization being provided by the in-stack hard biasing layer 86. When positive or negative magnetic incursions are introduced into the sensor 80, the magnetic moment 96 of the free layer 92 will rotate upwardly or downwardly out of the plane of FIG. 9 (i.e. toward or away from the reader). Note that sense current will not be shunted through the hard biasing layer 92 due to its insulative properties.

Accordingly, a GMR spin valve sensor has been disclosed, together with a magnetic head and disk drive incorporating the same, and methods for sensor fabrication. The sensor has an in-stack, electrically insulative hard biasing layer that does not shunt sense current away from the sensor and does not require the formation of complicated contiguous junctions. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A magnetic disk drive having a housing, a magnetic disk rotatably supported in the housing, a rotary actuator adapted to position a transducer-carrying slider above a recording surface of the magnetic disk, and a GMR sensor formed as part of the transducer, the sensor being adapted to sense magnetically recorded information on the recording surface, and comprising:
   a multilayer stack that includes:
   a ferromagnetic free layer having a substantially free magnetic moment;
   a ferromagnetic pinned layer having a substantially fixed magnetic moment oriented generally perpendicular to said free layer magnetic moment;
   a nonmagnetic electrically conductive spacer layer sandwiched between said pinned layer and said free layer;
   an in-stack, electrically insulative hard biasing layer adapted to bias said free layer, said hard biasing layer having a substantially fixed magnetic moment oriented substantially antiparallel to a zero bias point of said free layer magnetic moment; and
   an insulative spacer layer between said free layer and said hard biasing layer;
   said insulative spacer layer separating said hard biasing layer from said free layer so that said free layer is biased by way of a magneto-static coupling that stabilizes said free layer magnetic moment without pinning said free layer via exchange coupling; and a pair of electrodes respectively disposed on either side of said multilayer stack and in contact with said free layer, said pineed layer, said conductive spacer layer, said insulative hard biasing layer and said insulative spacer layer;

said electrodes being adapted to pass electrical current through said multilayer stack while said insulative hard biasing layer and said insulative spacer layer prevent current shunting away from said free layer, said pinned layer and said conductive spacer layer by virtue of being electrically insulative.

2. A disk drive in accordance with claim 1 wherein said hard biasing layer comprises a hard ferromagnetic layer.

3. A disk drive in accordance with claim 1 wherein said hard biasing layer comprises a material selected from the group consisting of CoFeO, FeHfO and alloys thereof.

4. A disk drive in accordance with claim 1 wherein said hard biasing layer is formed with high negative magnetostriction and large compressive stress so as to be self pinned.

5. A disk drive in accordance with claim 1 wherein said hard biasing layer is pinned by an adjacent electrically insulative pinning layer.

6. A disk drive in accordance with claim 5 wherein said pinning layer is adapted to pin said hard biasing layer by way of ferromagnetic exchange coupling or by raising its magnetic coercivity (Hc).

7. A disk drive in accordance with claim 5 wherein said pinning layer comprises a material selected from the group consisting of alpha-$Fe_2O_3$ and NiO.

8. A disk drive in accordance with claim 7 wherein said pinning layer comprises alpha-$Fe_2O_3$ and is formed either above or below said hard biasing layer on an opposite side of said hard biasing layer from said free layer.

9. A disk drive in accordance with claim 7 wherein said pinning layer comprises NiO and is formed below said hard biasing layer on an opposite side of said hard biasing layer from said free layer.

10. A disk drive in accordance with claim 1 wherein said hard biasing layer constitutes all or part of a gap layer of the transducer.

11. A method of making a GMR sensor comprising:
forming a ferromagnetic pinned layer having a substantially fixed magnetic moment;
forming an electrically conductive spacer layer above said ferromagnetic pinned layer;
forming a ferromagnetic free layer above said electrically conductive spacer layer;
forming an electrically insulative spacer layer above said free layer; and
forming an in-stack, electrically insulative hard biasing layer above said insulative spacer layer;
said insulative spacer layer separating said hard biasing layer from said free layer so that said free layer is biased by way of a magneto-static coupling that stabilizes said free layer magnetic moment without pinning said free layer via exchange coupling;
said layers being collectively arranged as a multilayer stack; and
forming a pair of electrodes respectively disposed on either side of said multilayer stack and in contact with said free layer, said pinned layer, said conductive spacer layer, said insulative hard biasing layer and said insulative spacer layer;
said electrodes being adapted to pass electrical current through said multilayer stack while said insulative hard biasing layer and said insulative spacer layer prevent current shunting away from said free layer, said pinned layer and said conductive spacer layer by virtue of being electrically insulative.

12. A method in accordance with claim 11 wherein said hard biasing layer comprises a ferromagnetic material and is self pinned.

13. A method in accordance with claim 11 wherein said hard biasing layer comprises a ferromagnetic material having high resistivity and is pinned by an electrically insulative pinning layer adapted to pin said hard biasing layer by way of ferromagnetic exchange coupling or by increasing its magnetic coercivity (Hc).

14. A method in accordance with claim 13 wherein said pinning layer comprises a material selected from the group consisting of alpha-$Fe_2O_3$ and NiO.

15. A method in accordance with claim 11 wherein said hard biasing layer comprises a material selected from the group consisting of CoFeO, FeHfO and alloys thereof.

16. A method of making a GMR sensor comprising:
forming an in-stack, electrically insulative hard biasing layer;
forming an electrically insulative spacer layer above said hard biasing layer;
forming a ferromagnetic free layer above said electrically insulative spacer layer;
forming an electrically conductive spacer layer above said ferromagnetic free layer; and
forming a ferromagnetic pinned layer above said electrically conductive spacer layer, said ferromagnetic pinned layer having a substantially fixed magnetic moment;
said insulative spacer layer separating said hard biasing layer from said free layer so that said free layer is biased by way of a magneto-static coupling that stabilizes said free layer magnetic moment without pinning said free layer via exchange coupling;
said layers being collectively arranged as a multilayer stack; and
forming a pair of electrodes respectively disposed on either side of said multilayer stack and in contact with said free layer, said pinned layer, said conductive spacer layer, said insulative hard biasing layer and said insulative spacer layer;
said electrodes being adapted to pass electrical current through said multilayer stack while said insulative hard biasing layer and said insulative spacer layer prevent current shunting away from said free layer, said pinned layer and said conductive spacer layer by virtue of being electrically insulative.

17. A method in accordance with claim 16 wherein said hard biasing layer comprises a ferromagnetic material and is self pinned.

18. A method in accordance with claim 16 wherein said hard biasing layer comprises a ferromagnetic material having high resistivity and is pinned by an electrically insulative pinning layer is adapted to pin said hard biasing layer by way of ferromagnetic exchange coupling or by raising its magnetic coercivity (Hc).

19. A method in accordance with claim 16 wherein said hard biasing layer comprises a material selected from the group consisting of CoFeO, FeHfO and alloys thereof.

20. A method in accordance with claim 18 wherein said pinning layer comprises a material selected from the group consisting of alpha-$Fe_2O_3$ and NiO.

21. A magnetic head having a GMR read sensor situated between a pair of electrical leads for delivering a sense current through the sensor, the sensor comprising:
a multilayer stack that includes:

a ferromagnetic free layer having a substantially free magnetic moment;

a ferromagnetic pinned layer having a substantially fixed magnetic moment oriented generally perpendicular to said free layer magnetic moment;

a nonmagnetic electrically conductive spacer layer sandwiched between said pinned layer and said free layer;

an in-stack, electrically insulative hard biasing layer adapted to bias said free layer, said hard biasing layer having a substantially fixed magnetic moment oriented generally antiparallel to a zero bias point of said free layer magnetic moment; and an insulative spacer layer between said free layer and said hard biasing layer;

said insulative spacer layer separating said hard biasing layer from said free layer so that said free layer is biased by way of a magneto-static coupling that stabilizes said free layer magnetic moment without pinning said free layer via exchange coupling; and a pair of electrodes respectively disposed on either side of said multilayer stack and in contact with said free layer, said pinned layer, said conductive spacer layer, said insulative hard biasing layer and said insulative spacer layer;

said electrodes being adapted to pass electrical current through said multilayer stack while said insulative hard biasing layer and said insulative spacer layer prevent current shunting away from said free layer, said pinned layer and said conductive spacer layer by virtue of being electrically insulative.

22. A magnetic head in accordance with claim 21 wherein said hard biasing layer comprises a hard ferromagnetic layer.

23. A magnetic head in accordance with claim 21 wherein said hard biasing layer comprises a material selected from the group consisting of CoFeO, FeHfO and alloys thereof.

24. A magnetic head in accordance with claim 21 wherein said hard biasing layer is made from a ferromagnetic material and is self pinned.

25. A magnetic head drive in accordance with claim 21 wherein said hard biasing layer is made from a ferromagnetic material and is pinned by an electrically insulative pinning layer.

26. A magnetic head in accordance with claim 25 wherein said pinning layer is adapted to pin said hard biasing layer by way of ferromagnetic exchange coupling or by raising its magnetic coercivity (Hc).

27. A magnetic head in accordance with claim 25 wherein said pinning layer comprises a material selected from the group consisting of alpha-$Fe_2O_3$ and NiO.

28. A magnetic head in accordance with claim 27 wherein said pinning layer comprises alpha-$Fe_2O_3$ and is formed either above or below said hard biasing layer on an opposite side of said hard biasing layer from said free layer.

29. A magnetic head in accordance with claim 27 wherein said pinning layer comprises NiO and is formed below said hard biasing layer on an opposite side of said hard biasing layer from said free layer.

30. A magnetic head in accordance with claim 21 wherein said hard biasing layer constitutes all or part of a gap layer of said magnetic head.

31. A GMR sensor, comprising:

a multilayer stack that includes:

a ferromagnetic free layer having a substantially free magnetic moment;

a ferromagnetic pinned layer having a substantially fixed magnetic moment oriented generally perpendicular to said free layer magnetic moment;

a nonmagnetic electrically conductive spacer layer sandwiched between said pinned layer and said free layer;

an in-stack, electrically insulative hard biasing layer adapted to bias said free layer, said hard biasing layer having a substantially fixed magnetic moment oriented generally antiparallel to a zero bias point of said free layer magnetic moment; and an insulative spacer layer between said free layer and said hard biasing layer;

said insulative spacer layer separating said hard biasing layer from said free layer so that said free layer is biased by way of a magneto-static coupling that stabilizes said free layer magnetic moment without pinning said free layer via exchange coupling; and a pair of electrodes respectively disposed on either side of said multilayer stack and in contact with said free layer, said pinned layer, said conductive spacer layer, said insulative hard biasing layer and said insulative spacer layer;

said electrodes being adapted to pass electrical current through said multilayer stack while said insulative hard biasing layer and said insulative spacer layer prevent current shunting away from said free layer, said pinned layer and said conductive spacer layer by virtue of being electrically insulative.

32. A sensor in accordance with claim 31 wherein said hard biasing layer comprises a hard ferromagnetic layer.

33. A sensor in accordance with claim 31 wherein said hard biasing layer comprises a material selected from the group consisting of CoFeO, FeHfO and alloys thereof.

34. A sensor in accordance with claim 31 wherein said hard biasing layer is made from a ferromagnetic material and is self pinned.

35. A sensor in accordance with claim 31 wherein said hard biasing layer is made from a ferromagnetic material and is pinned by an electrically insulative pinning layer.

36. A sensor in accordance with claim 35 wherein said pinning layer is adapted to pin said hard biasing layer by way of ferromagnetic exchange coupling or by raising its magnetic coercivity (Hc).

37. A sensor in accordance with claim 35 wherein said pinning layer comprises a material selected from the group consisting of alpha-$Fe_2O_3$ and NiO.

38. A sensor in accordance with claim 37 wherein said pinning layer comprises alpha-$Fe_2O_3$ and is formed either above or below said hard biasing layer on an opposite side of said hard biasing layer from said free layer.

39. A sensor in accordance with claim 37 wherein said pinning layer comprises NiO and is formed below said hard biasing layer on an opposite side of said hard biasing layer from said free layer.

* * * * *